Oct. 30, 1962     C. W. HILL     3,061,709
ARC TORCH HANDLE GAS VALVE
Filed Nov. 10, 1958
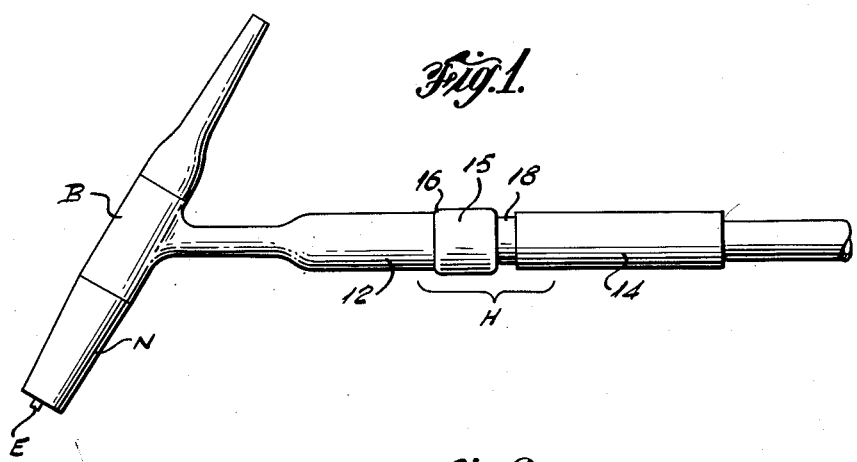
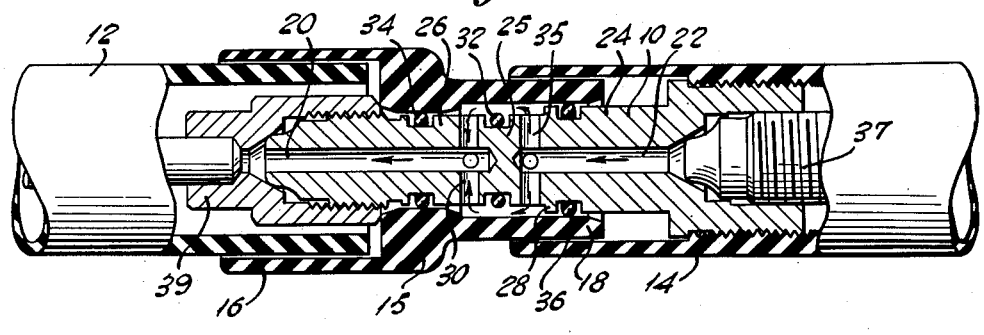
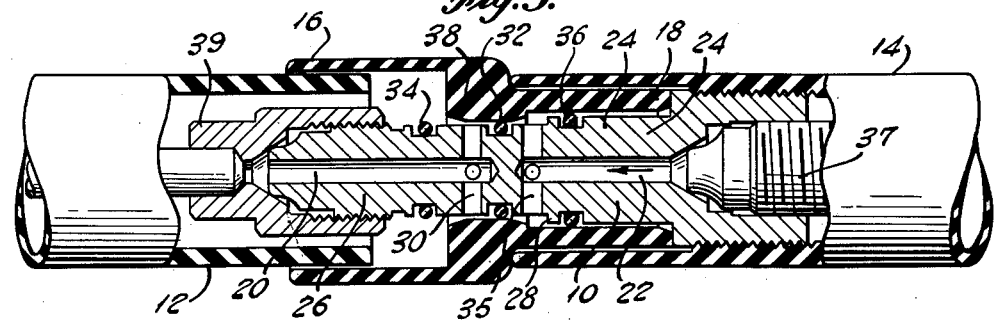
INVENTOR.
CLIFFORD W. HILL
BY
Richard S. Shreve
ATTORNEY United States Patent Office 3,061,709
Patented Oct. 30, 1962

3,061,709
ARC TORCH HANDLE GAS VALVE
Clifford W. Hill, Mountainside, N.J., assignor to Union Carbide Corporation, a corporation of New York
Filed Nov. 10, 1958, Ser. No. 772,745
3 Claims. (Cl. 219—75)

This invention relates to arc torch handle gas valves and, more particularly, to means mounted in the handle of a torch, such as shown in Scheller Patent No. 2,685,631, for shutting off the flow of argon to the gas-directing nozzle.

Prior attempts to provide a valve in the torch handle have added considerably to the overall weight and dimensions of the torch handle. This adds to operator fatigue and decreases maneuverability of the torch, particularly with work of difficult access.

The main objects of the present invention are to avoid the above difficulties and to provide an in-line, slide-type valve of particular advantages for the purposes described.

In the drawings:

FIG. 1 is a side elevation of a torch provided with the valve according to the preferred embodiment of the present invention;

FIG. 2 is an axial section through the handle of the torch, showing the valve open; and FIG. 3 is a similar view showing the valve closed.

The torch comprises an electrode holder B having a gas-directing nozzle N surrounding an electrode E, and a handle H by which the torch may be manipulated. Mounted in the handle H is a gas conducting tube 10 for supplying gas to the nozzle N. This tube 10 is preferably also electric current conducting for supplying current to the electrode E.

The handle H comprises axially spaced insulating shells 12 and 14. A by-pass member 15 is slidably mounted on the tube 10 between the shells 12 and 14. The by-pass member 15 is preferably constructed of insulating material, and has one end of larger diameter forming a collar 16 to slide over the outside of the shell 12, and the other end of smaller diameter forming a skirt 18 to slide under the inside of the shell 14.

The tube 10 has an axial bore 20 in the front end thereof and an opposed aligned axial bore 22 in the rear, separated by a partition 25. The tube 10 has one end portion of larger diameter forming a head 24, and the other end portion of smaller diameter forming a stem 26, with an external shoulder 28 therebetween. The stem 26 is provided with radial drillings 30 and 35 on each side of the partition 25 intersecting the respective bores. A packing ring, such as an O-ring 32, is mounted in a groove in the partition 25, another O-ring 34 in a groove in the stem 26 on the other side of the drillings 30 therefrom, and an O-ring 36 in a groove in the head 24.

Gas from a supply bore enters through a fitting 37 to the bore 22, and from the bore 20 the gas passes through a fitting 39 to a pipe leading to the nozzle N.

The by-pass member 15 has a constricted internal portion intermediate its ends forming a throat 38 which receives the stem 26, and in the closed position of FIG. 3 engages the O-ring 32 while the skirt 18 receives the head 24 and engages the O-ring 36.

To open the valve, the by-pass sleeve is pushed toward the torch head which, as shown in FIG. 2, moves the throat 38 away from the shoulder 28 to enlarge the chamber therebetween within the skirt 18, and bridges the drillings 30 around the partition 25. This by-pass chamber is confined between the O-rings 34 and 36.

What is claimed is:

1. In a gas shielded arc torch having an electrode holder, a gas directing nozzle surrounding an electrode in said holder, and a handle for the torch, an electrically conductive tube inside said handle for supplying current to said electrode and gas to said nozzle, the improvement which comprises, said handle having axially spaced insulating shells, and a by-pass member of insulating material slidable on said electrically conductive tube between said spaced insulating shells for turning on and shutting off the flow of shielding gas through said tube to said nozzle.

2. Gas shielded arc torch as claimed in claim 1, in which said by-pass member is a sleeve having one end of larger diameter to slide over the outside of one of said handle shells, and the other end of smaller diameter to slide under the inside of the other of said handle shells.

3. In a gas shielded arc torch having an electrode holder, a gas directing nozzle surrounding an electrode in said holder, and a handle for the torch, an electrically conductive tube inside said handle for supplying current to said electrode and gas to said nozzle, the improvement which comprises, said tube having a transverse partition and radial drillings on each side thereof, said handle having axially spaced aligned insulated shells, and a by-pass member of insulating material slidable on said electrically conductive tube between said spaced shells to span the drillings and connect them around said partition for supplying shielding gas to said nozzle.

References Cited in the file of this patent
UNITED STATES PATENTS

| | | |
|---|---|---|
| 2,444,767 | Cobean | July 6, 1948 |
| 2,509,671 | Christensen | May 30, 1950 |
| 2,760,754 | Gladstone | Aug. 28, 1956 |